United States Patent
Girishankar et al.

(10) Patent No.: US 10,657,471 B2
(45) Date of Patent: May 19, 2020

(54) INTELLIGENT ASSIGNMENT OF AGENTS

(71) Applicant: Freshdesk Inc., San Bruno, CA (US)

(72) Inventors: Vignesh Girishankar, Chennai (IN); Karthik Viswanathan, Chennai (IN); A N Sankar Ganesh, Thoothukudi (IN)

(*) Notice: Subject to any disclaimer, the term of this patent is extended or adjusted under 35 U.S.C. 154(b) by 98 days.

(21) Appl. No.: 15/594,354

(22) Filed: May 12, 2017

(65) Prior Publication Data

US 2018/0225607 A1 Aug. 9, 2018

(30) Foreign Application Priority Data

Feb. 8, 2017 (IN) .............................. 201741004508

(51) Int. Cl.
*G06Q 10/06* (2012.01)
*H04L 12/58* (2006.01)

(52) U.S. Cl.
CPC ...... *G06Q 10/06311* (2013.01); *H04L 51/043* (2013.01); *H04L 51/14* (2013.01); *H04L 51/34* (2013.01)

(58) Field of Classification Search
None
See application file for complete search history.

(56) References Cited

U.S. PATENT DOCUMENTS

| | | |
|---|---|---|
| 7,346,576 B2 | 3/2008 | Lent et al. |
| 8,713,117 B2 | 4/2014 | Downes et al. |
| 9,148,512 B1* | 9/2015 | Kumar ................ H04M 3/5232 |
| 9,203,796 B2 | 12/2015 | Hsiao et al. |
| 2004/0189698 A1* | 9/2004 | Bokish .................. H04M 3/523 715/751 |
| 2009/0094368 A1* | 4/2009 | Best ...................... H04L 51/043 709/228 |
| 2009/0100371 A1 | 4/2009 | Hu |
| 2009/0164214 A1* | 6/2009 | Baciu .................. H04M 3/5191 704/235 |
| 2009/0245500 A1* | 10/2009 | Wampler .......... H04M 3/42382 379/265.09 |
| 2012/0197678 A1* | 8/2012 | Ristock .................. G06Q 10/06 705/7.15 |
| 2014/0307863 A1 | 10/2014 | Snyder et al. |
| 2015/0200906 A1* | 7/2015 | Ganesh .................... H04L 51/34 709/206 |
| 2016/0104215 A1 | 4/2016 | Cist et al. |

OTHER PUBLICATIONS

"Always Be Support Ready" found at http://customer360.co/360mobi/360mobi-for-enhanced-chat-management/, accessed on May 11, 2017.
"Applozic" found at https://www.applozic.com/features.html, accessed on May 11, 2017.

(Continued)

*Primary Examiner* — Thomas J Dailey
(74) *Attorney, Agent, or Firm* — LeonardPatel LC

(57) ABSTRACT

A process for balancing loads among active agents within an agent group. The process may include distinguishing, by a load balancing server, an active conversation from an inactive conversation. The process may also include assigning, by the load balancing server, the active conversation from one active agent to another active agent depending on a number of active conversations assigned to each of the plurality of active agents within the agent group.

20 Claims, 5 Drawing Sheets

(56) References Cited

OTHER PUBLICATIONS

"Auto-Assigning Tickets to Agents in a Group" found at https://support.freshservice.com/support/solutions/articles/157134-auto-assigning-tickets-to-agents-in-a-group, access on May 11, 2017.
"HelpCrunch" found at http://helpcrunch.com.
"LiveChat" found at https://www.livechatinc.com/features, accessed on May 11, 2017.
"Meet Customers Where They Are" found at https://www.salesforce.com/assets/pdf/misc/DS_meet_customers_where_they_are.pdf, accessed on May 11, 2017.
"Talkus.io" found at https://www.talkus.io/, accessed on May 11, 2017.
"Ticket Auto Assign" found at https://www.manageengine.com/products/service-desk/help-desk-load-balancing.html, accessed on May 11, 2017.
"Userlike-Live Chat" at https://www.userlike.com/en/features, accessed on May 11, 2017.
"Where Tasks Manage Themselves" found at http://customer360.co/helpdesk-features/enhance-customer-engagement-with-task-management/, accessed on May 11, 2017.
"ZenDesk" found at https://support.zendesk.com/hc/en-us/articles/203662266-Monitoring-ticket-activity-and-agent-performance-with-reports, accessed on May 11, 2017.
Ruey-Shiang Shaw et al. "A Study of the Application of Ontology to an FAQ Automatic Classification System", the abstract found at http://dl.acm.org/citation.cfm?id=2240626, and accessed on May 12, 2017.

* cited by examiner

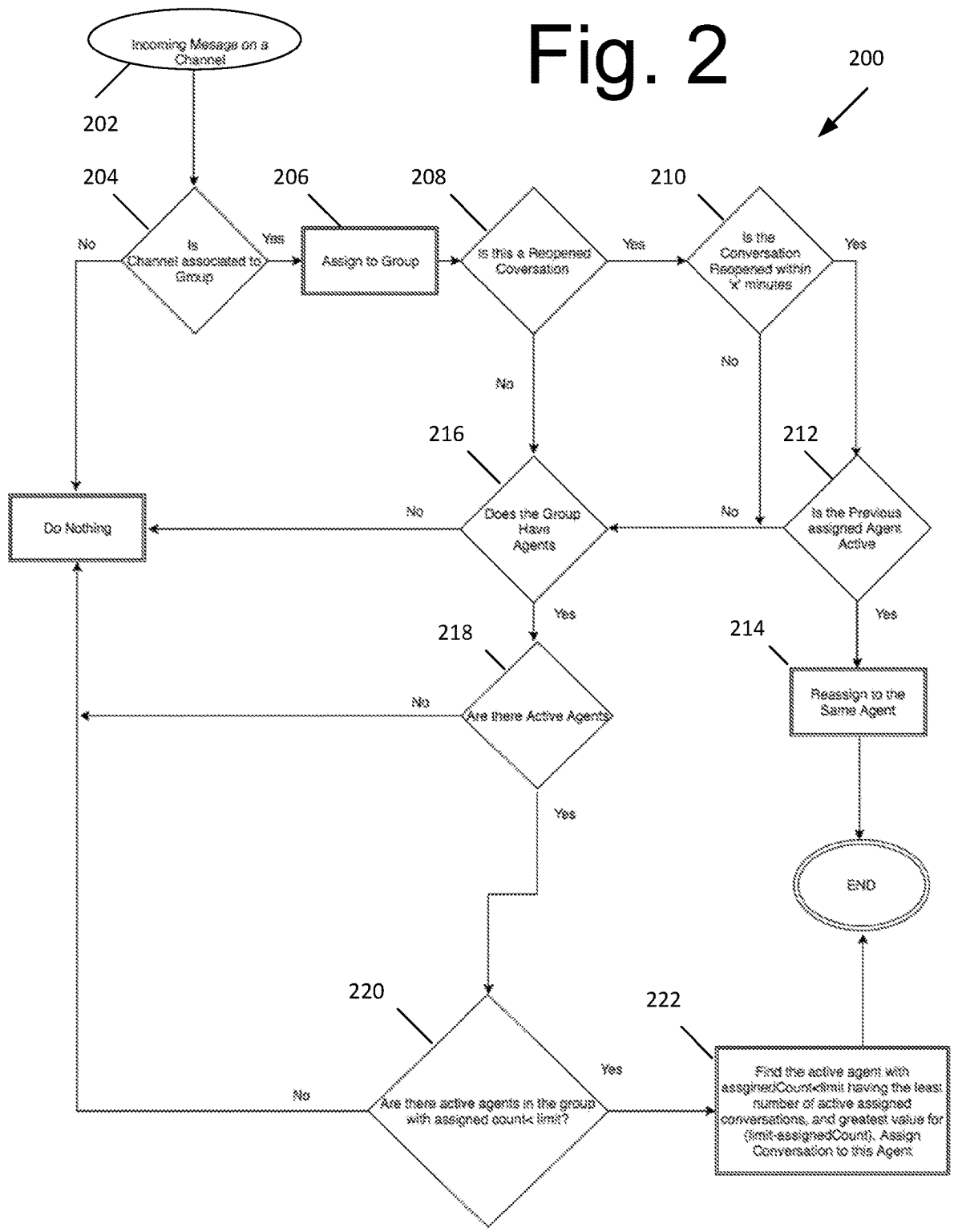

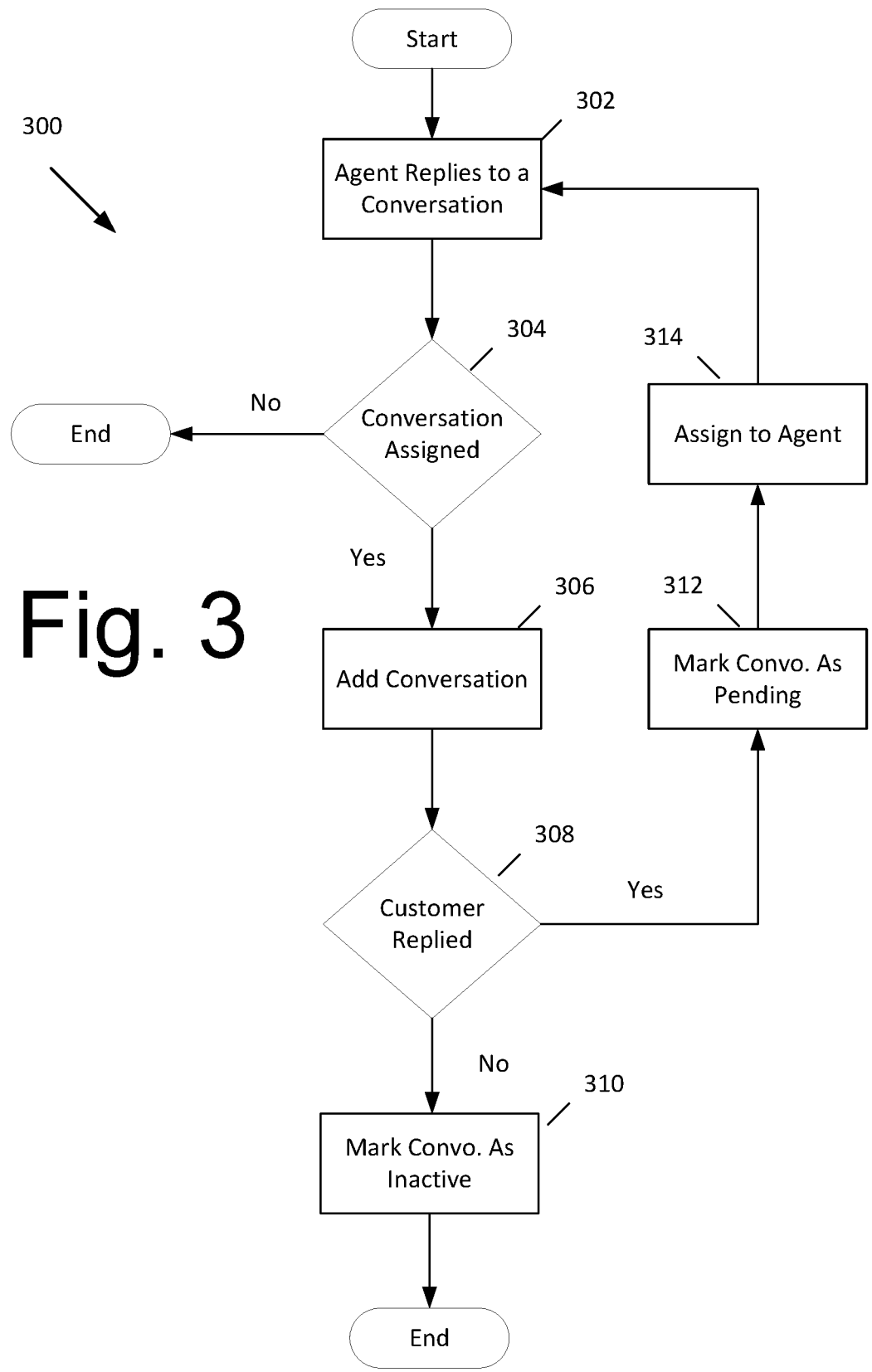

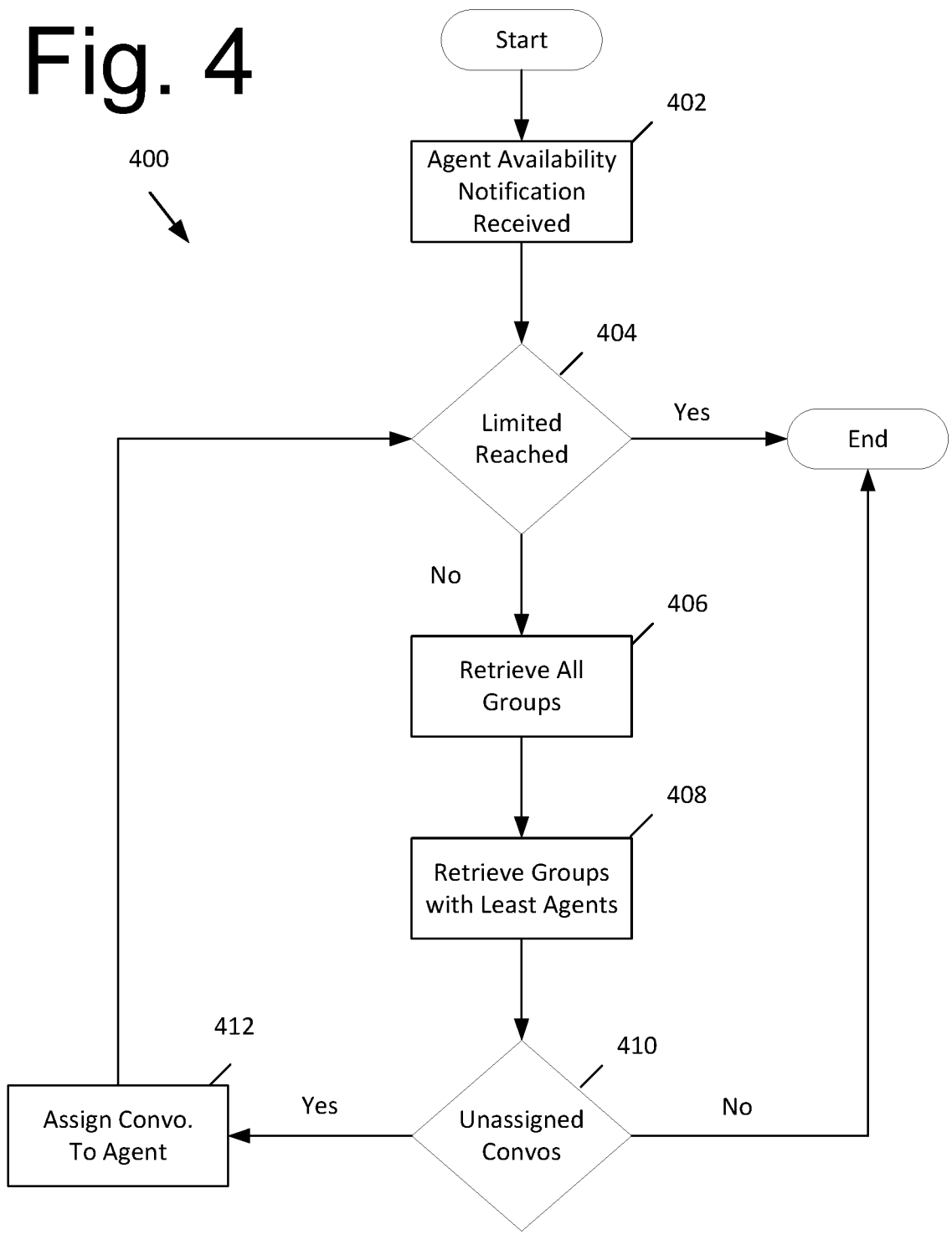

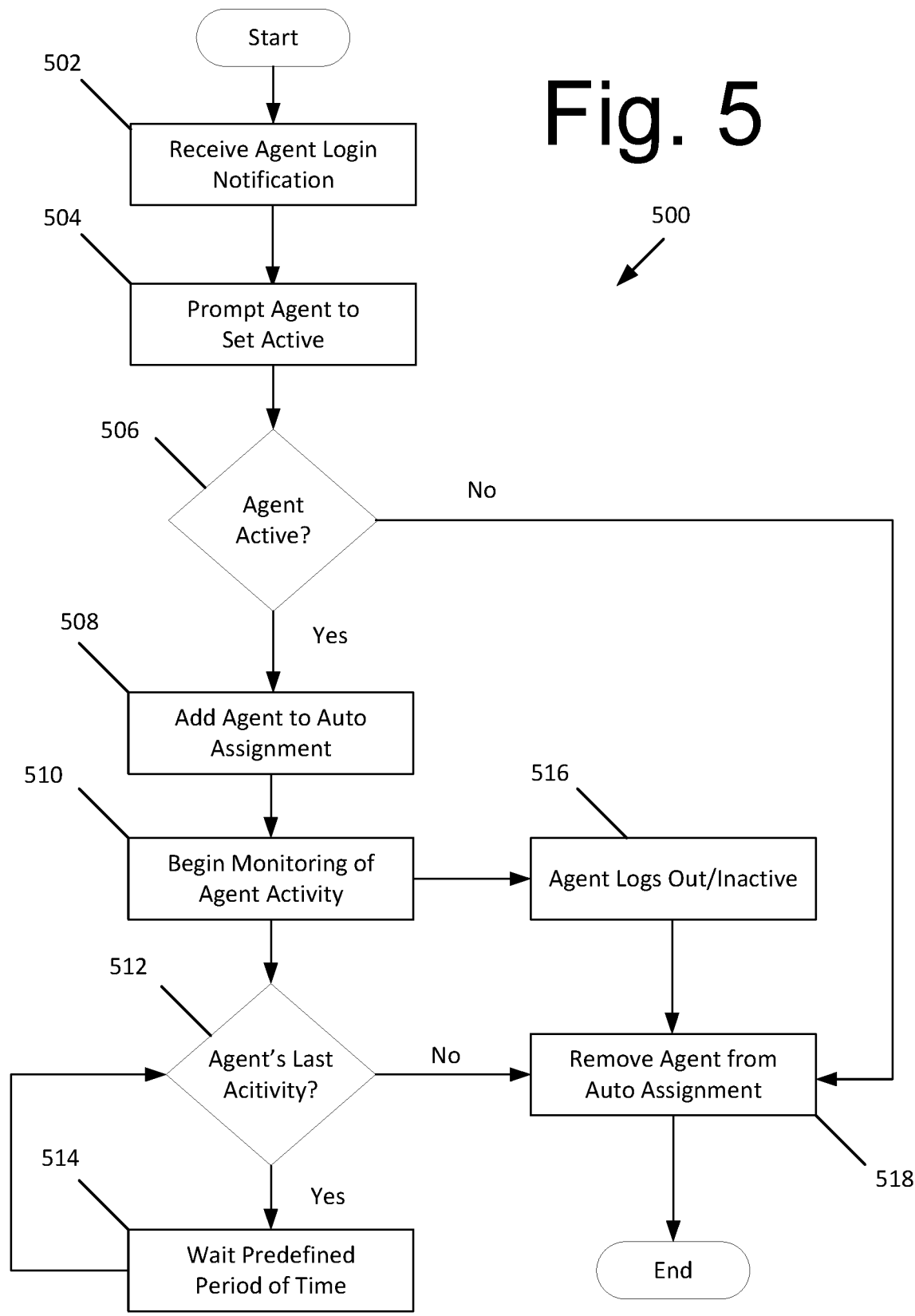

INTELLIGENT ASSIGNMENT OF AGENTS

CROSS-REFERENCE TO RELATED APPLICATION

This application claims priority to, and claims the benefit of, Indian Patent Application No. 201741004508, filed on Feb. 8, 2017. The subject matter thereof is hereby incorporated herein by reference in its entirety.

FIELD

The present invention relates to messaging application, and more particularly, to load balancing (or assignment) of conversations to support agents.

BACKGROUND

When users communicate with agents through an electronic communication medium, such as an iMessage™, at the system, the system continuously monitors and manages the conversation for each agent or agent group. For example, the load for each agent may be managed through a round robin assignment or based on the number of conversations that the agent is currently assigned to.

In the round robin example, if five agents are available, the system will sequentially switch the message assignment between the five available agents. In the load balance assignment example, if there are five agents actively communicating with other users and a sixth agent becomes active, then any new communication (or conversation) will be assigned to the sixth agent. This will occur regardless of the number of active conversations assigned to each agent.

Conventional live chat systems need to ensure that any user, who is currently online and interested to join a chat, is connected as quickly as possible to an available agent. This is usually accomplished by placing the users in a queue and assigning the queued chats to agents. Users need to stay connected to the chat session to remain in the queue, and if they get disconnected, the users are removed from the queue. Similarly, agents remain connected to the ongoing chat until the session is ended. Generally, an agent's load is capped based on the number of ongoing chats. Therefore, traditional live chat systems involve a session-based chat, in which the user and agent need to continuously stay connected and available. Such a chat is considered to be completed whenever either of them disconnects from the session. This implies that communication between the user and the agent must occur in real-time.

These techniques are not built for asynchronous messaging use cases. An asynchronous messaging system allows the user and agent to communicate without the need to be locked into sessions. The user and agent do not need to be simultaneously online to communicate, and thus, their interactions can be distributed over a longer timeline.

A conversation between the user and the agent generally begins when the first message is sent by the user or the agent and can be continued at any time. For example, in a mobile environment, a consumer will typically engage with the agent at his or her convenience. In other words, the consumer typically will not respond to the agent's message within a predefined period of time. Using the above approaches in the mobile environment may result in improper load balancing. This will create a delay in the response time between the user and the agent.

Because the concept of a conversation (between the consumer and agent) being active or inactive is not considered by existing systems, moving the conversation from one agent to another based on the conversation being active or inactive, etc., are not performed in a comprehensive manner, the above-mentioned techniques may further slow the communication processing time for each conversation in the system.

Thus, an alternative process for load balancing the assignment for each agent may be beneficial.

SUMMARY

Certain embodiments of the present invention may provide solutions to the problems and needs in the art that have not yet been fully identified, appreciated, or solved by current messaging systems. For examples, some embodiments generally pertain to intelligent assignment of conversations between the user and the agent in order to manage the load of the agents and improve the response time between the user and the agent.

In an embodiment, a computer-implemented process is provided for balancing the load among a plurality of active agents within an agent group. The computer-implemented process may include distinguishing, by a load balancing server, an active conversation from an inactive conversation. The computer-implemented process may also include assigning, by the load balancing server, the active conversation from one active agent to another active agent depending on a number of active conversations assigned to each of the plurality of active agents within the agent group.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2 is flow diagram illustrating a process for assigning or reassigning a conversation to an agent, according to an embodiment of the present invention FIG. 3 is a flow diagram illustrating a process for marking the conversation as inactive or active, according to an embodiment of the present invention.

FIG. 4 is a flow diagram illustrating a process for assigning a conversation to an agent, according to an embodiment of the present invention.

FIG. 5 is a flow diagram illustrating a process for monitoring the activity or inactivity of the agent, according to an embodiment of the present invention.

DETAILED DESCRIPTION OF THE EMBODIMENTS

Figure 1:
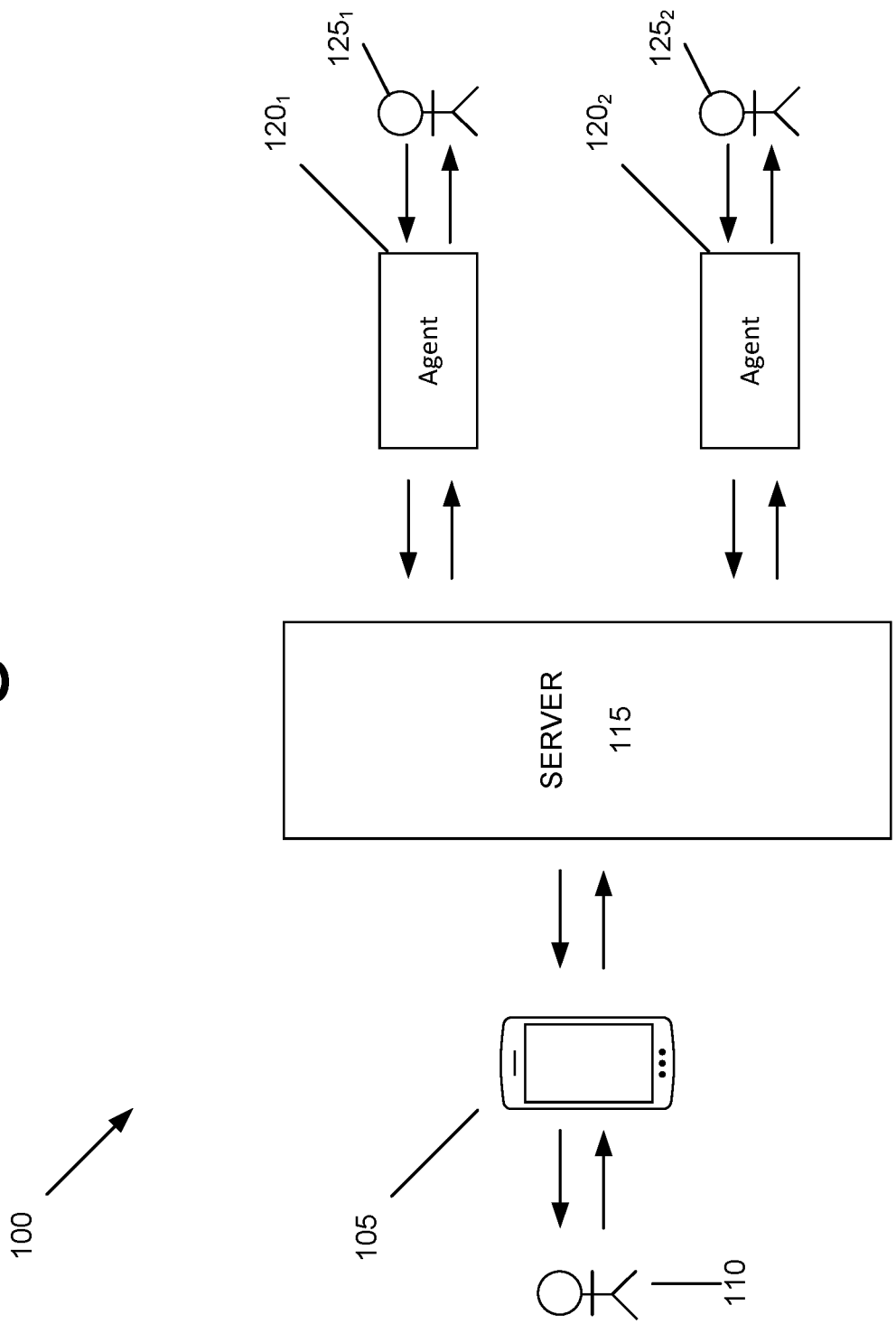
FIG. 1 is a schematic illustrating a load balancing system for balancing loads among the agents, according to an embodiment of the present invention.

FIG. 1 is a schematic illustrating a load balancing system 100 for balancing loads among the agents, according to an embodiment of the present invention. In this embodiment, load balancing system 100 includes a client (or user) device 105, which may be accessed by user 110, that communicates via an application to one or more agents $125_1$, $125_2$ accessing agent devices $120_1$, $120_2$. Although FIG. 1 illustrates a client device, a person of ordinary skill in the art will appreciate that load balancing system 100 may include a plurality of client devices. Load balancing system 100 may also include multiple agent and agent devices. Although mobile device 105 is depicted in FIG. 1, one of ordinary skill in the art will readily appreciate that any suitable type of computing device may be used to transmit a message from the consumer to the agent without deviating from the scope of the invention. One of ordinary skill in the art would also appreciate that more than one client device may connect to server 115 in order to communicate with one or more agent devices $120_1$, $120_2$. Server 115 may include at least one processor and memory comprising a set of instruction to execute the process described in FIGS. 2-5 below. Server 115 may also include additional components and modules to facilitate the execution of the processes.

The application may be configured to display one or more message channels (not shown) on client device 105 to user 110. The one or more message channels may assist user 110 in communicating with one or more agents $125_1$, $125_2$ via server 115. One of ordinary skill in the art would appreciate that agent $125_1$, $125_2$ may use any type of computing device such as a mobile device, a portable computing device, etc.

By implementing message channels in the application, new or ongoing conversations between the user 110 and one or more agents $125_1$, $125_2$ may be conducted in a more efficient manner. Further, for each new or ongoing conversation, server 115 may balance the load for each agent $125_1$, $125_2$. This may result in decreasing the processing or transmission time between each communication. In some embodiments, when the message channel is selected by user 110 of client device 105, a conversation is initiated. This conversation may be assigned to an agent group, and in some embodiments, to an agent within the agent group.

FIG. 2 is a flow diagram illustrating a process 200 for assigning or reassigning a conversation to an agent, according to an embodiment of the present invention. In some embodiments, process 200 begins at 202 with the server receiving an incoming message for a selected channel from a user of a client device. At 204, the server determines whether the selected channel is associated with a group.

The group may include one or more agents, which may be active or inactive. An active agent may mark himself or herself as available or unavailable for the load balancing system, and may be considered as being active or inactive, accordingly. The load balancing system may also keep track of the agent logging out and inactivity (e.g., no mouse movements and/or clicks for a predetermined period of time) to automatically mark the agent as active. See, for example, FIG. 5, which is a flow diagram illustrating a process 500 for monitoring the activity or inactivity of the agent, according to an embodiment of the present invention.

In some embodiments, process 500 begins at 502 with the server receiving notification that an agent has logged into the load balancing system. At 504, the server prompts the agent to set himself or herself as active. At 506, the server determines if the agent sets himself as active, and if not, then at 518 the server removes the agent from automatic assignment. If the agent is set as active, then at 508 the server adds the agent to automatic assignment for load balancing. At 510, the server begins monitoring the agent activity. If the agent logs out or marks himself or herself as inactive at 516, then the server at 518 removes the agent from automatic assignment.

The server at 512 determines if the agent's last activity is within a predefined period of time. The predefined period of time may be set by the administrator in some embodiments. In an embodiment, if the agent's last activity is within the predefined period of time, then the server at 514 may wait for some time period (e.g., 30 seconds), before checking the agent's last activity at 512. The server may also at 518 remove the agent from automatic assignment if the agent's last activity has exceeded the time limit.

Returning to FIG. 2, if the channel is not associated with a group, then the server does nothing. This essentially means that the server (e.g., load balancing system), or in some embodiments, the agent has determined that the messages on the selected channel need not be load balanced.

If the channel for the incoming message is associated with a group, then the server at 206 assigns the incoming message for the selected channel to the associated group. At 208, the server determines whether the incoming message is for an existing (or reopened) conversation. If the server determines that the incoming message is not for a reopened conversation, the server determines at 216 whether the group has any agents. If the server determines that the group does not have any agents, then the server does nothing. In some embodiments, "do nothing" is an exit condition implying that the load balancing system (or server) has completed execution. When the group is empty, the server may not have any agents to assign the conversation to. In this case, the server will wait until one or more agents are added to the group. When the one or more agents are added to the group, the server may then determine which agent should be assigned to the conversation.

If the server determines that group has agents, then the server at 218 determines whether the agent group has active one or more agents. If there are no active agents, then the server does nothing. As noted earlier, the server may wait until one or more agents become active and/or available for assignment. If the group has active agents, then the server at 220 determines if there are any active agents in the group with an assign conversation count (or count) that is less than the predefined limit, i.e., assigned count<maximum count.

If the server determines that one or more active agents within the group have a count less than the maximum count, then the server at 220 finds and selects the active agent with the least number of actively assigned conversations (e.g., the lowest count) and assigns the incoming message to the selected agent. The server may also increase the count for the selected agent once the incoming message is assigned in certain embodiments. If all of the agents have a count that is greater than the maximum count (i.e., count>maximum count), then the server does nothing. Similar to above, the server may wait until one or more agents become active and/or available. In some further embodiments, the server may wait until the active agent has a count less than the maximum count to be assigned the conversation.

Returning to 208, when the conversation is reopened, the server at 210 determines if the conversation reopened within a predefined period of time. The period of time may vary depending on the configuration of the load balancing system (or intelligent assignment system). If not, then the process moves to 216 and proceeds as discussed above. If the conversation reopened within the predefined period of time, then the server at 212 determines if the previously assigned agent in the group is active. If the previously assigned agent within the group is not active, then the process moves to 216 and proceeds as discussed above. Otherwise, if the previously assigned agent in the group is active, then the server at 214 reassigns the incoming message to the previously assigned agent.

In some instances, when a conversation is reopened, the user may not be satisfied with the resolution, or might have a related problem, which is still unresolved. The probability of this is higher if the user reopens the conversation within a few minutes after the conversation is marked as being resolved. In these instances, it may be beneficial to assign reopened conversation to the agent who previously worked in it, since he or she may be best suited to reply to the user. In the event that the user reopens the conversation, e.g., a few days after the conversation was resolved, then it may be possible that reopened conversation is for a different issue. In this case, the reopened conversation may be assigned to another agent depending on availability.

FIG. 3 is a flow diagram illustrating a process 300 for marking the conversation as inactive or active, according to an embodiment of the present invention. In some embodiments, process 300 begins at 302 with the server receiving a notification that the agent replied to an existing conversation. An existing conversation in some embodiments may be defined as a conversation with a previous interaction between the user and one or more agents. In certain embodiments, since a resolved conversation can be reopened at a later time, an existing conversation may be defined as a conversation that has been marked by the agent as being resolved.

At 304, the server determines whether the conversation assigned to the agent, who submitted the reply, was assigned by the server. If the server did not assign the conversation to the agent, then process 300 ends. Otherwise, the server adds the conversation to a queue at 306. The queue may include one or more conversations, and may identify the conversation as active or inactive.

For active conversations, the server waits for a predefined period of time before marking the conversation as inactive. For example, at 308, the server determines after a predefined period of time (e.g., within the inactive time period), whether the user (e.g., the customer) has replied to the agent's message. If the user did not respond within the predefined period of time, the server at 310 marks the conversation as inactive. The conversation will remain inactive until the user replies to the agent's message, or until the agent sends another message, or both.

If the server determines at 308 that the user replied within the predefined period of time, then at 312, the server marks the conversation as pending. In some embodiments, the conversation may already be marked as pending. In those embodiments, the status of the conversation will remain as pending. At 314, since the user has replied to the agent's message in this example, the server may assign the user's message to the same agent or another agent. The assignment of the message may be in accordance with process 200 of FIG. 2, for example.

FIG. 4 is a flow diagram illustrating a process 400 for assigning a conversation to an agent, according to an embodiment of the present invention. In some embodiments, the process begins at 402 with the server receiving notification that the agent is available for a conversation to be assigned. This may occur when the agent was previously inactive and became active, or when the agent completes a previously assigned conversation, which means a different conversation can now be assigned to this agent.

At 404, the server determines whether the agent reached the max count, e.g., whether the number of assigned conversations for the agent is greater than or equal to max number of conversations that can be assigned to any one agent. If the server determines that the agent reached the max count, then process 400 ends.

If, however, the server determines that the agent has not reached the max count, then at 406, the server retrieves all agent groups. At 408, the server determines and selects the agent group with the least number of agents, and at 410, the server determines whether the agent group has any unassigned conversation(s). If the server determines that the agent group does not have any unassigned conversation(s), then the process returns to step 408, allowing the server to retrieve and select the next agent group with the second least number of agents. If the server determines that the agent group has unassigned conversation(s), then the server assigns the conversation(s) to one or more agents. The process of assigning may be the same as process 200 of FIG. 2.

Some embodiments may pertain to an intelligent assignment module within the load balancing system that distinguishes active conversations from inactive conversations, and assigns active conversations from one active agent to another active agent within the agent group for the purposes of load balancing. Because conversations through various electronic mediums, such as text messages, may be long-lived from a consumer standpoint, load balancing of the active conversations may improve real-time conversation between a consumer and an active agent. This way, the consumer does not have to wait for an agent that is inactive, nor does the agent have to wait for a response from a consumer that is not actively participating in the conversation.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiments," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented process for balancing load among a plurality of active agents within an agent group, comprising:
   distinguishing, by a load balancing server, an active conversation from an inactive conversation;
   for the active conversation,
      determining, by the load balancing server, whether a user has replied to an agent's message, and
      when the user fails to reply to the agent's message within the predefined period of time, marking, by the load balancing server, the active conversation as inactive while allowing the user and the agent assigned to the now inactive conversation to remain connected until the now inactive conversation is marked as active and until the agent is reassigned to another active conversation or until another agent is reassigned to the active conversation; and
   for the inactive conversation,
      marking, by the load balancing server, the inactive conversation as active when the user replies to the agent's message or when the agent sends a subsequent message; and
   assigning, by the load balancing server, the active conversation from one active agent to another active agent depending on a number of active conversations assigned to each of the plurality of active agents within the agent group.

2. The computer-implemented process of claim 1, further comprising:
   counting, by the load balancing server, the number of active conversations assigned to each of the plurality of active agents within the agent group; and
   selecting, by the load balancing server, the active agent with the least amount of active conversations within the agent group in order to assign the active conversation to the selected active agent.

3. The computer-implemented process of claim 1, further comprising:
   determining, by the load balancing server, if an incoming message from a client device is an active conversation.

4. The computer-implemented process of claim 3, further comprising:
   selecting, by the load balancing system, a previously assigned active agent within the agent group for assignment of the incoming message, when the incoming message is identified as an active conversation and is received within a predefined period of time.

5. The computer-implemented process of claim 3, further comprising:
   searching, by the load balancing system, for an active agent within the agent group with least number of active conversations, when the incoming message is identified as an active conversation and received after a predefined period of time; and
   selecting, by the load balancing system, the active agent with the least number of active conversations for assignment of the incoming message.

6. The computer-implemented process of claim 1, further comprising:
   adding, by the load balancing server, an agent reply message for an active conversation to a queue, wherein the queue comprises a plurality of active conversations, a plurality of inactive conversations, or both.

7. The computer-implemented process of claim 6, further comprising:
   marking, by the load balancing server, the active conversation associated with the agent reply message as being inactive if an incoming message from a user of a client device is not received within a predefined period of time.

8. The computer-implemented process of claim 6, further comprising:
   marking, by the load balancing server, the active conversation associated with the agent reply message as being pending if an incoming message from a user of a client device is received within a predefined period of time.

9. The computer-implemented process of claim 1, further comprising:
   receiving, by the load balancing server, a notification of agent status change from inactive to active.

10. The computer-implemented process of claim 9, further comprising:
    retrieving, by the load balancing server, one or more agent groups, each of the one or more agent group comprises one or more active, inactive, or both agents;
    searching, by the load balancing server, for one or more agent groups with least number of active agents prior to selecting an agent group with least amount of active agents;
    determining, by the load balancing system, whether the selected agent group has one or more unassigned active conversations; and
    selecting, by the load balancing server, the active agent with the least number of active conversations for assignment of the one or more unassigned active conversation.

11. An apparatus for balancing load among a plurality of active agents within an agent group, comprising:
    at least one processor; and
    memory comprising a set of instructions,
    wherein the set of instructions, with the at least one processor, are configured to distinguish an active conversation from an inactive conversation; and
    for the active conversation,
       determine whether a user has replied to an agent's message, and
       when the user fails to reply to the agent's message within the predefined period of time, mark the active conversation as inactive while allowing the user and the agent assigned to the now inactive conversation to remain connected until the now inactive conversation is marked as active and until the agent is reassigned to another active conversation or until another agent is reassigned to the active conversation,
       and for the inactive conversation,
mark the inactive conversation as active when the user replies to the agent's message or when the agent sends a subsequent message;
assign the active conversation from one active agent to another active agent depending on a number of active conversations assigned to each of the plurality of active agents within the agent group.

12. The apparatus of claim 11, wherein the set of instructions, with the at least one processor, are further configured to
count the number of active conversations assigned to each of the plurality of active agents within the agent group; and
select the active agent with the least amount of active conversations within the agent group in order to assign the active conversation to the selected active agent.

13. The apparatus of claim 11, wherein the set of instructions, with the at least one processor, are further configured to
determine if an incoming message from a client device is an active conversation.

14. The apparatus of claim 13, wherein the set of instructions, with the at least one processor, are further configured to
select a previously assigned active agent within the agent group for assignment of the incoming message, when the incoming message is identified as an active conversation and is received within a predefined period of time.

15. The apparatus of claim 13, wherein the set of instructions, with the at least one processor, are further configured to
search for an active agent within the agent group with least number of active conversations, when the incoming message is identified as an active conversation and received after a predefined period of time; and
select the active agent with the least number of active conversations for assignment of the incoming message.

16. The apparatus of claim 11, wherein the set of instructions, with the at least one processor, are further configured to
add an agent reply message for an active conversation to a queue, wherein the queue comprises a plurality of active conversations, a plurality of inactive conversations, or both.

17. The apparatus of claim 16, wherein the set of instructions, with the at least one processor, are further configured to
mark the active conversation associated with the agent reply message as being inactive if an incoming message from a user of a client device is not received within a predefined period of time.

18. The apparatus of claim 16, wherein the set of instructions, with the at least one processor, are further configured to
mark the active conversation associated with the agent reply message as being pending if an incoming message from a user of a client device is received within a predefined period of time.

19. The apparatus of claim 11, wherein the set of instructions, with the at least one processor, are further configured to
receive a notification of agent status change from inactive to active.

20. The apparatus of claim 19, wherein the set of instructions, with the at least one processor, are further configured to
retrieve one or more agent groups, each of the one or more agent group comprises one or more active, inactive, or both agents;
search for one or more agent groups with least number of active agents prior to selecting an agent group with least amount of active agents;
determine whether the selected agent group has one or more unassigned active conversations; and
select the active agent with the least number of active conversations for assignment of the one or more unassigned active conversation.

* * * * *